Patented Nov. 24, 1953

2,660,533

UNITED STATES PATENT OFFICE 2,660,533

REFRACTORY AND ITS MANUFACTURE

Howard F. West and John H. Veale, Joliet, Ill., assignors to Illinois Clay Products Company, Joliet, Ill., a corporation of Illinois No Drawing. Application February 23, 1950, Serial No. 145,911

6 Claims. (Cl. 106—56)

This invention relates to refractories suitable for use in ladles for molten iron or steel, cupola linings, tap hole plugs, runners, and other structures subjected to the corrosive action of the molten metal and the slag carried with the metal.

The invention involves the purification of iron and steel in ladles, etc. by means of a refractory designed to assist in reduction of the sulphur impurity and to resist the corrosive action of the molten slag.

The nature of the invention may be readily understood by reference to one illustrative product and its method of use described in the following specification.

Molten iron and steel contain sulphur which is one of the most objectionable impurities. In open hearth furnaces, for example, the sulphur is reduced to permissible amounts by holding the metal in the open hearth in the presence of added lime (for periods substantially longer than would be necessary to prepare the metal if no sulphur were present) until periodic analyses show that the sulphur content has been brought within permissible limits. This, of course, cuts down production of the open hearth, which is a very expensive piece of equipment. Moreover, conditions in the open hearth for efficient desulphurization with lime are far from ideal. Pick up of sulphur in the open hearth prolongs the reduction thereof and increases the time required in the open hearth merely for desulphurization. The added lime results in a very corrosive basic slag.

The illustrative refractory comprises fire clay or other hydrated aluminous refractory, carbon, and acid aluminum sulphate as a chemical (unfired) bonding agent. The latter is advantageously developed by the reaction between concentrated sulphuric acid and the alumina in the fire clay or other aluminous refractory. For convenience, the fire clay and other aluminous materials will be referred to as clays or clay minerals. In most uses a ceramic bond is developed in service as the chemical bond (acid aluminum sulphate) is progressively destroyed by heat in use. The clay mineral used should therefore be determined by the temperature reached in service. High alumina materials such as bauxite, diaspore, and gibbsite, while developing a satisfactory acid aluminum sulphate bond, requires substantially higher temperatures than are ordinarily encountered in ladles, to develop a ceramic bond.

The carbon in the refractory serves the dual function of protecting the clay thereof from the corrosive action of the basic slag and creating reducing conditions in the ladle resulting (1) in reaction between the FeO in the slag and the carbon (as a result of which the FeO is reduced to iron) to create a mild boiling action or agitation in the molten metal, and (2) in creating reducing conditions favorable to removal of sulphur.

We have discovered that a substantial amount of the sulphur may be removed in the ladle or other vessel (thereby increasing the production of the open hearth) by lining the ladle with the illustrative refractory. The refractory is of course, not limited in its use to open hearth steel, but is also useful in Bessemer ladles, iron ladles, blast furnace transfer ladles and in the runners for molten iron and steel. While it is also excellent as a refractory for general purposes, its special utility is in situations involving direct contact with molten iron and steel.

The refractory thus serves dual functions: as a liner for ladles or other receptacles for the molten metal, and as a refining agent. The refining action is three-fold: (1) agitation of molten metal by the reaction between the FeO in the slag and carbon in the refractory; (2) creation of reducing conditions favorable to elimination of sulphur; and (3) conversion of the sulphur to $SO_2$, as presently explained. Agitation results in purification or refining by bringing the sulphur into more intimate contact with the lime in the slag or other refining agents. Under the reducing conditions created by the illustrative refractory, lime readily reduces sulphur, thus:

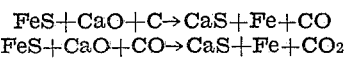

Both the carbon of the refractory and the CO act as reducing agents. Conversion of the sulphur to $SO_2$ is believed to result by release of $SO_3$ from the refractory under the high temperatures created by the metal, thus:

In connection with the elimination of sulphur from iron and steel, it should be noted that sulphur is eliminated easily even in the open hearth until the sulphur content is reduced to about .04%, after which elimination or reduction of the balance is much more difficult.

For low carbon steels wherein the slag contains a relatively high amount of FeO (FeO generally being added in the open hearth to bring down the carbon in the steel) a less reactive form of carbon is preferably used in the refractory to prevent too violent boiling in the metal. Less reactive carbon is graphite or graphitized carbon. Amorphous carbon begins to oxidize at 662° F. whereas graphite and graphitic carbon do not begin to oxidize until 842° F. High carbon steels have a lower amount of FeO in the slag because more FeO has been reduced by the carbon in the steel. The agitation or boiling resulting from the reaction between FeO and the carbon in the refractory, is therefore less. Moreover, high carbon steels are tapped (from the open hearth) at lower temperatures, which also contributes to a lower rate of reaction with the carbon. The same applies (for different reasons) to both Bessemer steel and iron, including iron from the blast furnace. In Bessemer steel there is less FeO and the slag is less basic, or even acid, since only the lime from the blast furnace is present (none is added, as in the open hearth) and there is therefore practically a balance between the silica and the lime in the slag. In recent years the Bessemer furnace is finding increasing use, particularly between the blast furnace and the open hearth, to increase production of the open hearth.

With acid or less basic slags, the clay mineral and the carbon afford better mutual protection. The clay mineral is not dissolved away so readily by the less reactive slag (thus exposing less carbon for reaction with FeO); and because of the lower FeO content of the steel, there is a milder reaction with the carbon, hence less clay mineral is exposed to action of the slag. In such cases other forms of carbon (which have greater particle strength than graphite) may be used in the refractory. Calcined petroleum coke is one example of such carbon. It is strong and of high purity. Ordinary petroleum coke and by-product coke breeze are also useful as substitutes, though they have higher impurities and higher shrinkage.

Reduction in sulphur in the ladle after the iron or steel leaves the open hearth has substantial advantages over past practices: (1) The capacity of the open hearth is substantially increased by eliminating the additional time the metal has been held in the open hearth to desulphurize. (2) Whereas conditions in the open hearth are unfavorable to efficient removal of sulphur by means of lime, the reducing conditions and agitation in the ladle are favorable to efficient reduction in sulphur. Lime functions efficiently in this connection only under reducing conditions. (3) There is no danger of pick up of sulphur as in the open hearth. In the past, desulphurization between the blast furnace and the open hearth has been ineffective because of pick up of sulphur in the open hearth.

In the illustrative refractories, the carbon may vary from 15 to 40%, the balance clay minerals (including silica and other impurities naturally present in the clay) and commercial concentrated sulphuric acid. 20 to 40% of the clay employed may be replaced by grog (ground burned fire clay). The reaction between the grog and acid is the same as that between the clay and acid. The amount of acid used varies with the amount of alumina and the fineness of the particles in the clay mineral, i. e., the aggregate surface area of the particles. About 2 to 9% on the amount of clay mineral of 66 Bé. (commercial concentrated) sulphuric acid is used. For a common type of fire clay (containing 40 to 50% kaolinite) about 3% on the clay of concentrated sulphuric acid is used.

One illustrative refractory comprises:

| | Per cent |
|---|---|
| Calcined petroleum coke (−8 mesh) | 25 |
| Fire clay (40 to 50% kaolinite) (−8 mesh) | 75 |

To the dry ingredients, 3% on the amount of clay of concentrated sulphuric acid (66° Bé.) is added.

In such a refractory, if graphite be used in place of petroleum coke, the carbon is reduced preferably to about 20% graphite −30 mesh, and the clay increased to about 80%. A slight corresponding increase in acid should be made.

Silica may advantageously be added in place of some of the clay mineral to cause the refractory to expand slightly under heat. For example, about 10% free silica (in addition to the free silica in the fire clay) may be used. Generally the amount of silica added varies from 5 to 25%.

Water is not required unless it be necessary to secure a desired working consistency for forming the refractories. Excess water should be avoided, since most of it must eventually be driven off to develop maximum strength.

In mixing the constituents together, the acid is preferably added to the carbon or graphite and thoroughly mixed therewith before mixture with the clay mineral. This avoids agglomeration or balling up of the clay and interference with easy and thorough distribution of the clay throughout the mixture and of the acid over the surfaces of the clay particles.

After thorough mixing of the several ingredients to secure uniform distribution throughout the mass, the material is molded by a suitable method, such as dry pressing. Full strength is not developed until substantially all free water is driven off. This does not require high temperatures, although heat probably promotes reaction and facilitates the removal of excess or uncombined water. Temperatures of 250° F. are satisfactory for drying.

The reaction between the acid and the alumina of the clay may be expressed thus:

$$Al_2O_3 + 4H_2SO_4 \rightarrow Al_2(SO_4)_3 \cdot H_2SO_4 \cdot 3H_2O$$

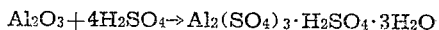

The product of the reaction, namely, the acid aluminum sulphate bond, may be expressed by the general formula $Al_2(SO_4) \cdot XH_2SO_4 \cdot YH_2O$. X may vary from 1 to 5, and Y probably does not exceed 10. While other aluminum compounds may be used in the reaction, clay minerals (e. g. fire clay) are preferred because they are inexpensive and generally available, and, to the extent of their plasticity, they improve the working and forming characteristics of the mixture.

Upon completion of the reaction, the strength obtained (in dry pressed brick, for example) is substantially in excess of all requirements. Strength should exceed a modulus of rupture of 500 pounds per square inch. The illustrative brick has a modulus of rupture of 500 to 1100 pounds per square inch, with a preferred minimum of 850 pounds per square inch.

Resistance to water is a characteristic of the acid aluminum sulphate bond (as contrasted with aluminum sulphate) and indicates generally the extent of formation of acid aluminum sulphate as compared with aluminum sulphate. In other words, moisture resistance increases with strength.

As stated above, the amount of acid necessary to develop sufficient acid aluminum sulphate to secure adequate bonding strength varies in general with the fineness of the particles of clay mineral, i. e., with the aggregate surface area of the particles. For example, only 3 to 4% of acid is required for a clay having the following screen analysis:

|  | Per cent |
|---|---|
| Minus 4 plus 20 mesh | 50 |
| Minus 20 plus 65 mesh | 15 |
| Minus 65 mesh | 35 | whereas about 9% acid is required to secure the same strength with finer clay; e. g., 80% through 100 mesh.

The foregoing seems to apply regardless of the type of clay mineral employed. Generally kaolins (comprising the clay mineral kaolinite) are coarser than montmorillonite and are preferred where it is desirable to minimize the amount of acid required. Maximum strength with a minimum amount of acid can be obtained with clay aggregates if the particle size be graded for minimum porosity.

The use of excess acid is immediately revealed in reduction of strength of the bonded material. Apparently no more than 5 molecules of acid will combine with $Al_2O_3$, thus:

$$Al_2(SO_4)_3 \cdot 5H_2SO_4 \cdot YH_2O$$

Excess acid is present as free acid and weakens the bond. Free acid may be present even though a substantial amount of the clay be unreacted. Apparently this results because the film of acid aluminum sulphate around a particle of clay mineral is relatively impervious and prevents the acid from reaching and reacting with the interior of the particle. In other words, the acid aluminum sulphate is advantageously formed only on the surfaces of the clay particles, where it can react efficiently as a bonding agent. It is likely, therefore, that no more bonding agent than can function efficiently as such, is formed, excess acid being present simply as free acid. A deficiency of acid, on the other hand, probably limits a portion of the reaction to the formation of aluminum sulphate, instead of continuing the reaction to form acid aluminum sulphate. Aluminum sulphate, while functioning as a relatively poor bonding agent, is not moisture resistant and is otherwise unsatisfactory.

Strength can be greatly increased, of course, by the use of pressure in forming the refractory, since it increases the intimacy of contact essential for a strong bond.

When exposed to the action of molten metal and basic slag in a ladle or other receptacle, a ceramic bond develops progressively as the acid aluminum sulphate is decomposed. $SO_3$ is released and aids in removing sulphur, as explained above.

The illustrative refractory possesses another advantageous property in iron and steel ladles: Slag and the so-called steel skull (the residue at the bottom of the ladle which often is too cool to flow out of the ladle) does not adhere strongly to the lining (containing carbon or graphite) and may be easily dumped or pulled out. Heretofore the slag and the skull have adhered so strongly to the lining that the slag has had to be chipped out and removal of the skull has pulled out part of the lining, requiring extensive repairs to the lining, or replacement thereof. In ladles for iron (where the temperatures are lower than in steel ladles) the acid slag tends to build up around the upper portion of the ladle. It may be removed much more easily from a lining made of the illustrative refractory.

This application is a continuation-in-part of our copending application Serial 93,195.

Obviously the invention is not limited to the details of the illustrative product and its method of manufacture, since these may be variously modified. Moreover, it is not indispensable that all features of the invention be used conjointly since various features may be used to advantage in different combinations and sub-combinations.

Having described our invention, we claim:

1. A refractory comprising in combination a clay mineral containing alumina and silica as its major constituents and 15 to 40% by weight particles of carbon bonded with acid aluminum sulphate, the balance being the aforesaid clay mineral.

2. A refractory comprising in combination a fire clay and 15 to 40% by weight particles of carbon bonded into a coherent mass by acid aluminum sulphate, the balance being fire clay.

3. A refractory comprising in combination a clay mineral containing alumina and 15 to 40% by weight granular carbon bonded by acid aluminum sulphate formed by the reaction of a portion of the clay mineral with 2 to 9% by weight of sulphuric acid, the balance being the aforesaid clay mineral.

4. A refractory comprising in combination by weight about 75% fire clay and 25% carbon in the form of calcined petroleum coke, said clay and carbon being bonded together with acid aluminum sulphate formed by the reaction between a portion of said clay and about 3% on the amount of clay of concentrated sulphuric acid.

5. A clay refractory comprising in combination by weight 15 to 40% carbon and 85 to 60% clay comprising alumina and silica, said carbon and clay being bonded together with acid aluminum sulphate formed by the reaction of a portion of the clay with about 2 to 9% on the amount of clay of sulphuric acid.

6. A refractory comprising in combination clay comprising alumina and silica, and 15 to 40% by weight of carbon, said clay and carbon being bonded together with acid aluminum sulphate formed by the reaction of a portion of said clay with about 2 to 9% on the amount of clay of concentrated sulphuric acid, the balance being clay and inert aggregates.

HOWARD F. WEST.
JOHN H. VEALE.

References Cited in the file of this patent

UNITED STATES PATENTS

| Number | Name | Date |
|---|---|---|
| 253,748 | Nehring | Feb. 14, 1882 |
| 261,430 | Clapp et al. | July 18, 1882 |
| 354,126 | Godley | Dec. 14, 1886 |
| 581,942 | Saniter | May 4, 1897 |
| 581,943 | Saniter | May 4, 1897 |
| 1,339,266 | Linbarger | May 4, 1920 |